TRAVELING WAVE TUBE MODULATOR CIRCUIT

Filed Feb. 25, 1964 2 Sheets-Sheet 1

INVENTOR
R. P. MASSEY
BY Walter M. Hill
ATTORNEY

July 5, 1966 R. P. MASSEY 3,259,855

TRAVELING WAVE TUBE MODULATOR CIRCUIT

Filed Feb. 25, 1964 2 Sheets-Sheet 2

United States Patent Office 3,259,855

Patented July 5, 1966

3,259,855

TRAVELING WAVE TUBE MODULATOR CIRCUIT

Richard P. Massey, Westfield, N.J., assignor to Bell Telephone Laboratories, Incorporated, New York, N.Y., a corporation of New York Filed Feb. 25, 1964, Ser. No. 347,311
10 Claims. (Cl. 332—7)

This invention relates to modulator circuits and more particularly to a modulator circuit for high voltage traveling wave tubes.

High voltage traveling wave tubes have heretofore been modulated by modulators of the hard tube type usually employing the so-called "floating deck" configuration. Prior art modulator circuits employing hard tubes are described in G. N. Glasoe and J. V. Lebacqz, Pulse Generators, vol. 5, Radiation Laboratory Series (1948), and in H. A. Reise, "Hard Tube" Pulsers for Radar, Bell Laboratories Record, April 1956, pages 153–156. The floating deck hard tube configuration has been described in J. P. Swanson, Modulator Techniques for Gridded Klystrons and Traveling Wave Tubes, the Microwave Journal for July 1959, pages 29–33.

The useful life of the hard tubes in the hard-tube modulator is limited to a few thousand hours and frequently does not exceed five thousand hours. It is highly desirable that the useful life of the modulator be extended considerably, particularly in systems where a large number of traveling wave tubes are to be employed.

It is an object of this invention to simplify the circuit structure of the modulator used in modulating traveling wave tubes as well as to materially extend the useful life of these modulators.

The foregoing object is achieved by this invention which comprises two bias sources of direct voltage connected in parallel between the traveling wave tube cathode and its modulating anode. One source is poled to turn the traveling wave tube beam on while the other source is poled to turn it off. Each source has a diode connected in series with it and a switching circuit is provided to alternately render one of these diodes conductive and the other one non-conductive.

The invention may be better understood by reference to the accompanying drawings, in which.

Figures 1, 2, 3, 4, 5, 6:
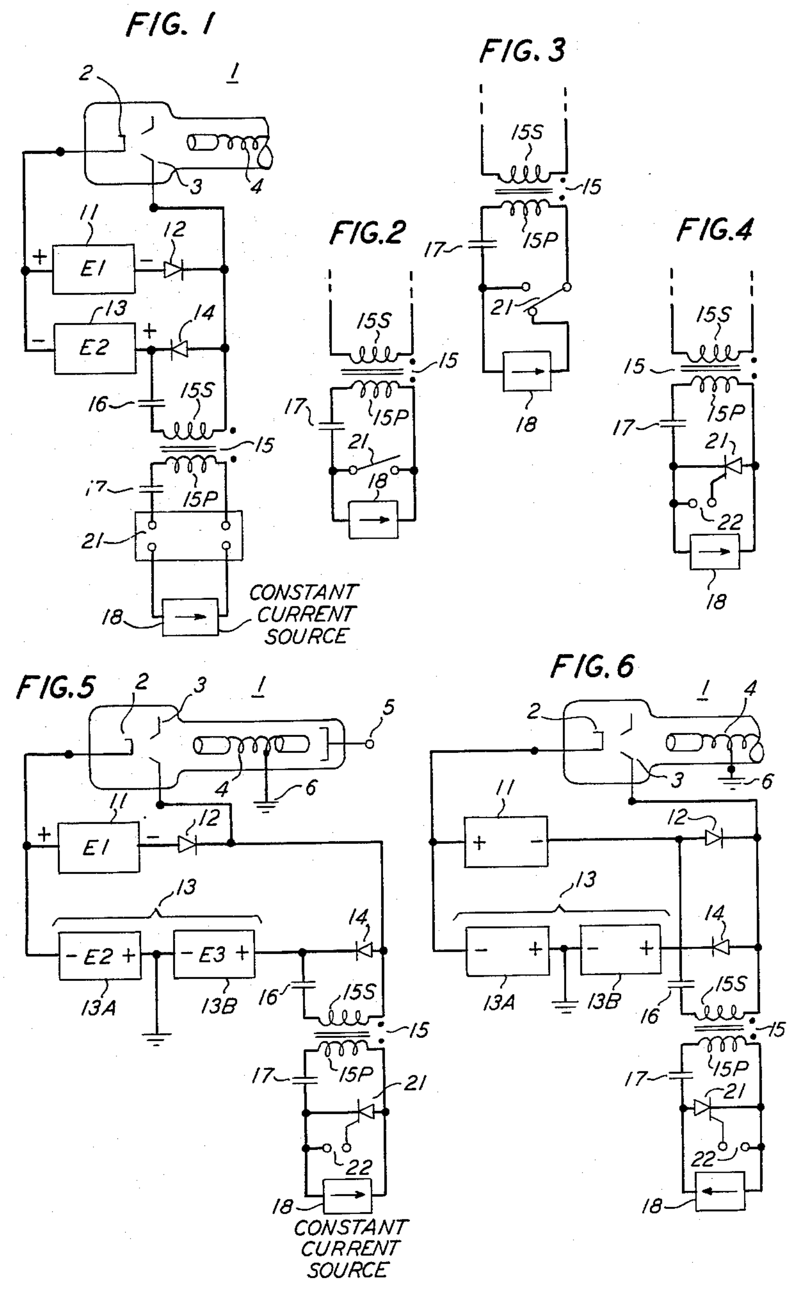
FIG. 1 is illustrative of the basic concept of this invention.
FIGS. 2, 3 and 4 illustrate alternative switch circuits which may be used for controlling the diodes in the circuit of FIG. 1.
FIG. 5 illustrates the switch circuit shown in FIG. 4 and circuit means for also controlling the bias on the helix of the traveling wave tube.
Figure 7:
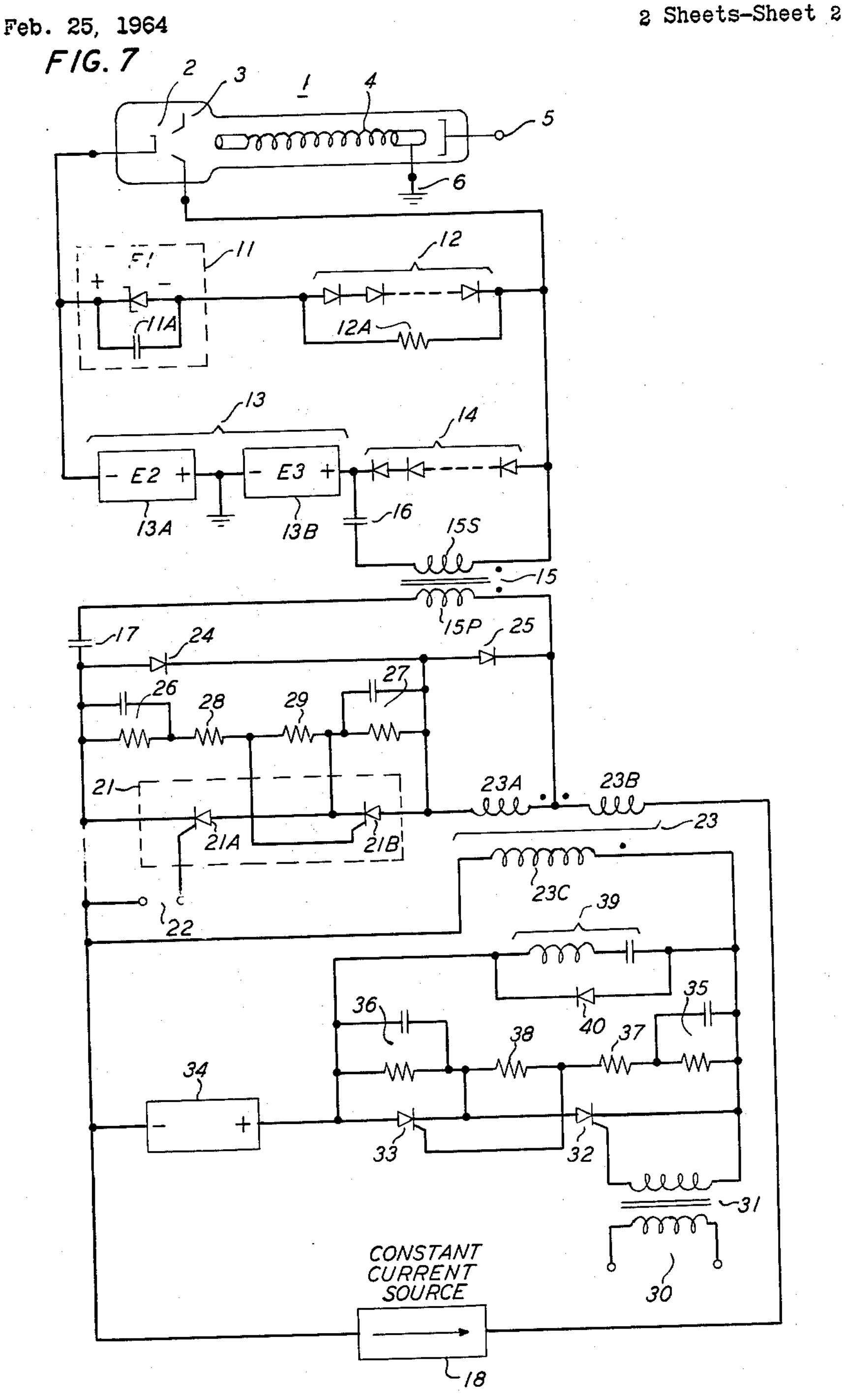

FIG. 6 discloses an alternative connection between the switch circuit and the diodes; and FIG. 7 discloses a more complete circuit diagram of one practical embodiment of the invention for modulating a high voltage traveling wave tube.

FIG. 1 discloses a circuit configuration of the essential elements of the modulator circuit of this invention. Reference numeral 1 refers to a traveling wave tube having a cathode 2, a modulating anode 3 and a helix 4. The rest of the traveling wave tube structure as well as the radio frequency coupling means have been deleted as unnecessary to a complete understanding of the structure and operation of this invention. The deleted parts are, of course, all conventional and well known in the art. In order to turn the beam of the traveling wave tube on, the modulating anode 3 must be made positive with reference to its cathode 2. The beam is turned "off" when this anode is made sufficiently negative with reference to the cathode. This is accomplished in accordance with this invention by providing one direct voltage source 11 of sufficient potential $E_1$ to negatively bias the anode to cut off the beam and a second direct voltage source 13 of potential $E_2$ to positively bias the anode, these two sources being connected in parallel between the cathode 2 and anode 3 through diodes 12 and 14, respectively. In order to effect the desired modulating function, it is necessary that only one of these diodes be conducting at any given instant. A switching means is therefore needed which will render one of these diodes conductive while the other is made non-conductive. This is accomplished by the pulse transformer 15, the two capacitors 16 and 17, a constant current source 18 and a suitable switch circuit 21 which either permits a constant current from source 18 to flow through winding 15P of pulse transformer 15 and capacitor 17 or directly connects capacitor 17 across winding 15P.

The mode of operation of this circuit is that when switch 21 permits the constant current from source 18 to flow through winding 15P and capacitor 17, the capacitor is charged at a constant rate and voltages are generated in both winding 15P and winding 15S which are positive at their dotted ends. The voltage generated in winding 15S causes diode 14 to conduct and charge capacitor 16 linearly with respect to time. When diode 14 is thus made conductive, a series circuit is established through direct voltage sources 11 and 13 to back-bias diode 12 and render it non-conductive. Source 13 is thereby connected directly across anode 3 and cathode 2 to turn the beam on. To turn the beam off, switch 21 functions to connect capacitor 17 directly across winding 15P, thereby permitting capacitor 17 to rapidly discharge through winding 15P and generate voltages in both windings negative at their dotted ends. The voltage generated in winding 15S is now aiding the voltage charge on capacitor 16 and their sum is designed to be substantially larger than the sum of potentials $E_1$ and $E_2$ of sources 11 and 13, thereby causing a current to flow in the reverse direction through these sources and forward bias diode 12. At the same time the sum of the generated potential in winding 15S and the charge on capacitor 16 back-biases diode 14 rendering it non-conductive. The result is that source 11 is now connected directly across the modulating anode 3 and cathode 2 and is so poled as to render the modulating anode sufficiently negative with respect to the cathode as to cut off the traveling wave tube beam. It will now be readily seen that by the rather simple and conventional switch operation described for switch 21, pulse transformer 15 and its associated circuitry is caused to alternately render diodes 12 and 14 conductive to alternately turn the traveling wave tube beam off and on as required.

FIGS. 2, 3 and 4 disclose alternative switches that may be used for switch 21 in FIG. 1. All of these switches have two operating states, one of which results in diode 12 becoming conductive and diode 14 non-conductive and the other resulting in diode 14 becoming conductive and diode 12 non-conductive. The switch in FIG. 2 is of the single-pole, single-throw type. In one of its operating states, namely, when the switch is open, current from sources 18 is permitted to flow at a constant rate through winding 15P and capacitor 17, resulting in a linear charging of the latter. As previously described, this will result in causing diode 14 to conduct and diode 12 to become non-conductive, thereby turning the beam on. Conversely, when switch 21 is closed to its other operating state, capacitor 17 is connected directly across winding 15P, thereby permitting it to discharge through the winding in a direction reverse from its charging direction. As previously described, this produces a voltage in winding 15S to back-bias diode 14 and forward-bias diode 12, thereby turning the beam off.

The switch arrangement shown in FIG. 3 is of the single-pole, double-throw type and in one of its operating states permits current to flow from source 18 through winding 15P and capacitor 17 while in its opposite operating state, it connects capacitor 17 directly across winding 15P, thereby resulting in the same sequence of operations previously described.

The switch in FIG. 4 is of the PNPN solid state type which functions as a single-pole, single-throw switch. When a control current is applied to terminals 22, the control electrode starts current flowing between the anode and cathode. When this switch is alternately opened and closed the same sequence of operations takes place as was described for the switch of FIG. 2.

FIG. 5 differs from the disclosure in FIG. 1 in only three respects. First, source 13 has been divided into two parts 13A and 13B, the junction between these two parts being grounded. The switch 21 is the type shown in FIG. 4 and the helix 4 is shown grounded at 6. The collector terminal 5 may be connected to any suitable source of potential which is preferably negative with respect to ground but positive with reference to the cathode. The purpose of placing a ground intermediate the extreme terminals of source 13 is to provide a negative bias potential $E_3$ for the helix with reference to the modulating anode 3 when the tube is turned on, i.e., when diode 14 is made conductive. The bias for this purpose is supplied by source 13B. It has been found in the operation of traveling wave tubes that positive ions are generated in the helix which are accelerated toward the highly negative cathode. To prevent their collision with the cathode, the accelerating anode 3 is made positive with respect to the helix, thereby repelling these ions and forcing them to move toward the collector. By this simple expedient, the same switching diodes can perform both functions, namely, to turn the beam on and off and also to prevent the collision of the positive ions with the cathode while the beam is on. This circuit operates otherwise in the same manner as previously described for FIG. 1, the traveling wave tube beam being turned off when diode switch 21 is closed and turned on when the diode switch is opened.

The circuit of FIG. 6 is essentially the same as that for FIG. 5 except that winding 15S is connected across diode 12 instead of across diode 14, the direction of the constant current flow from source 18 is reversed and the forward direction through diode switch 21 is reversed. The effect of this reversal of connections is to cause the traveling wave tube beam to turn on when diode switch 21 closes and turn off when the switch is opened, the operation otherwise being identical to that described for FIG. 5.

FIG. 7 shows one embodiment of a practical circuit embodying the basic circuit configuration of FIG. 5. This circuit shows a preferred form of modulating switch circuit that is especially adapted to meet the large ratio of off to on time required for a radar application. Where the traveling wave tube is used in a comunication system for the transmission of digital information, either the circuit configuration of FIG. 5 or FIG. 6 could be employed because in such instances the ratio of off to on time approaches unity. FIG. 7 also shows bias source 11 as a Zener diode which produces a virtual source of bias voltage $E_1$ when diode unit 12 conducts. Switch 21 is shown to comprise the two PNPN diode switch units 21A and 21B connected in series to act as if they were a single switch. The associated network 26, 27, 28 and 29 is provided to equalize the reverse voltages across the diodes and to store energy in their capacitors to facilitate rapid switching when a modulating pulse is applied to terminals 22. As previously described for FIGS. 4 and 5, when a pulse is applied to terminals 22, switch 21 closes. The first phase of this operation takes place with switch unit 21A closing to provide a path for the discharge of energy stored in the capacitor of network 26 through resistor 28 and through the parallel path of resistor 29 and the control circuit of switch unit 21B. The resulting current in the control circuit of switch unit 21B promptly closes this unit so that energy in the capacitor of network 27 can flow through it. The practical effect, therefore, is for both switch units of switch 21 to be very rapidly closed as if they were a single switch, thereby diverting the current from source 18 through switch 21 instead of through the pulse transformer primary 15P and capacitor 17. The effect of saturable transformer 23 will be more completely described later. It need only be said at this point that its core is in saturation so that the impedance of winding 23A is negligibly small. Capacitors 16 and 17, therefore, abruptly cease charging and begin discharging. The discharge voltage of capacitor 16, added to the voltage generated in winding 15S, results in rendering diode unit 12 conductive and turning the beam off as previously described. The time constants of the circuits are all chosen to keep the traveling wave tube biased off for a time greater than any normal time encountered in the use of transformer 15. To extend somewhat the off time of the beam beyond the time that diode unit 12 is held conducting, capacitor 11A is provided to maintain the bias on modulating anode 3 through resistor 12A. Capacitor 11A, being in shunt with the Zener diode in source 11, receives its charge when the Zener diode is in reverse conduction from current through diode unit 12. Resistor 12A, in shunt with diode unit 12, maintains a definite conductive path for the bias voltage when the diode unit 12 becomes non-conductive. Of course, at the instant diode unit 14 is made conductive, this bias is promptly overcome by source 13 and the tube is turned on as was previously described.

The traveling wave tube beam is turned on by applying a pulse to terminals 30. This pulse acts through isolation transformer 31 on switches 32 and 33 and their associated networks 35, 36, 37 and 38 in the same manner just described for switch 21 and its network. Saturable transformer 23 includes a turn-off winding 23A, a bias winding 23B and a control winding 23C. Bias winding 23B contains more turns than does turn-off winding 23A so that, when switch 21 is closed, current from source 18 through these windings will maintain the core switched to an initial state of saturation in a direction determined by bias winding 23B. Noting the polarity dots on transformer 23, it will become apparent that a current entering the dotted end of control winding 23C will assist the current flow from source 18 through winding 23A to overcome the bias provided by winding 23B and switch the core into reverse saturation. This causes transformer 23 to generate transient voltages in its windings polarized positive toward their dots so that the voltage in winding 23A momentarily impresses a reverse voltage on switch units 21A and 21B to promptly open switch 21. The voltage in winding 23A also momentarily maintains a charging current through primary 15P, capacitor 17 and diode 24, the low impedance of the latter limiting the reverse voltage across switch 21 to near zero. Diode 25, however, is back-based by this voltage.

Current for the control pulse in winding 23C, to effect the above-described sequence of operations, comes from source 34 through an obvious path including switch units 32 and 33. Shortly after the current pulse in control winding 23C has reversed the induction in the core of transformer 23 and opened switch 21, a resonant cut-off circuit 39 promptly opens switches 32 and 33 in the manner described by R. Dunn and J. Wood in Electronic Engineering for July 1963, pages 470 and 471. This operation may be readily understood by noting that, when switches 32 and 33 were open, source 34 had charged the capacitor of the resonant circuit 39 through its inductor and winding 23C. At the instant switch units 32 and 33 are closed, a transient ringing current starts from the discharge of the capacitor in circuit 39 through its inductor and through the closed switch units 32 and 33. Diode 40 remains back-biased during the first half period of the ringing current cycle which is made long enough to exceed the duration of the pulse applied to terminals 30. When the current in the ringing circuit 39 reverses its phase, the terminal voltage across the resonant circuit starts to exceed zero, being limited by the now conducting diode 40 but of sufficient magnitude to reverse bias and promptly open switches 32 and 33. Current from source 18, now flowing through only winding 23B, winding 15P and capacitor 17, switches the core of transformer 23 back to its original bias state, thereby generating voltage transients in its windings polarized negative at their dots. Diode 25 limits this transient voltage across winding 23A to near zero while diode 40, still being held conductive by the reverse phase of the ringing current, limits the voltage drop across switches 32 and 33. The ringing current is rapidly damped by diode 40 and recharging of the capacitor of circuit 39 resumes from source 34 to prepare it for the next pulse to be applied to terminals 30 to again turn the traveling wave tube on.

While some specific switch configurations have been disclosed for controlling the conductivity of diode units 12 and 14, it is quite evident that those skilled in this art could devise other equivalent means for accomplishing the same result and such equivalent means should be considered within the scope of this invention.

What is claimed is:

1. A modulator circuit for the beam of a traveling wave tube having a cathode and a modulating anode, said modulator circuit comprising one bias source of direct voltage connected in series with a first diode between said cathode and anode and poled to cut off said beam when said diode is rendered conductive, a second source of direct voltage connected in series with a second diode between said cathode and anode and poled to turn on said beam when said second diode is rendered conductive, and a switching means coupled to said two diodes to alternately render one diode conductive and the other one non-conductive.

2. The combination of claim 1 wherein said switching means comprises a pulse transformer having first and second windings, a capacitor connecting said first winding across one of said diodes, a second capacitor forming a series circuit with said second winding, a constant current source, and a switch having two operating states and so constructed and connected to said series circuit and to said constant current source that in one of its states it permits current to flow from said source through said series circuit and in the other of its states it directly connects said second capacitor across said second winding.

3. The combination of claim 2 wherein said switch is of a single-pole, double-throw type so connected that in one of its states it connects said source in series with said series circuit and in its other state it directly connects said second capacitor across said second winding.

4. The combination of claim 2 wherein said constant current source is connected directly to said series circuit and said switch is of the single-pole, single-throw type and connected directly across said source.

5. The combination of claim 2 wherein said constant current source is connected directly to said series circuit, said switch comprises a PNPN diode having anode, cathode and control terminals, and a circuit means connects said anode and cathode terminals across said source.

6. A modulator circuit for the beam of a traveling wave tube having a cathode, a modulating anode and a helix, said modulator circuit comprising one bias source of direct voltage connected in series with a first diode between said cathode and anode and poled to cut off said beam when said diode is rendered conductive, a second source of direct voltage connected in series with a second diode between said cathode and anode and poled to turn on said beam when said second diode is rendered conductive, means connecting said helix to a point in said second source of direct voltage so as to maintain said helix more negative than said anode when said second diode is rendered conductive, and a switching means coupled to said two diodes to alternately render one diode conductive and the other one non-conductive.

7. The combination of claim 6 wherein said switching means comprises a pulse transformer having first and second windings, a capacitor connecting said first winding across one of said diodes, a second capacitor forming a series circuit with said second winding, a constant current source, and a switch having two operating states and so constructed and connected to said series circuit and to said constant current source that in one of its states it permits current to flow from said source through said series circuit and in the other of its states it directly connects said second capacitor across said second winding.

8. The combination of claim 7 wherein said switch is of a single-pole, double-throw type so connected that in one of its states it connects said source in series with said series circuit and in its other state it directly connects said second capacitor across said second winding.

9. The combination of claim 7 wherein said constant current source is connected directly to said series circuit and said switch is of the single-pole, single-throw type and connected directly across said source.

10. The combination of claim 7 wherein said constant current source is connected directly to said series circuit, said switch comprises a PNPN diode having anode, cathode and control terminals, and a circuit means connects said anode and cathode terminals across said source.

References Cited by the Examiner

UNITED STATES PATENTS 2,881,349 4/1959 Eichenbaum et al. ---- 332—7 X

References Cited by the Applicant

Microwave Journal, Modulator Techniques for Gridded Klystrons and Traveling Wave Tubes, pages 29–33, July 1959.

ROY LAKE, *Primary Examiner.*

A. L. BRODY, *Assistant Examiner.*